United States Patent Office 3,758,501
Patented Sept. 11, 1973

3,758,501
SUBSTITUTED HETEROCYCLIC DERIVATIVES OF AZEPINE
Martin Joseph Weiss, 975 Phyliss Lane, Oradell, N.J. 07649; Gabriel Joseph Gibs, 87 Violet Drive, Pearl River, N.Y. 10965; John Frank Poletto, 35 Nanuet Ave., Nanuet, N.Y. 10954; and William Alan Remers, 108 Pawnee Drive, West Lafayette, Ind. 47906
No Drawing. Filed Oct. 1, 1971, Ser. No. 185,876
Int. Cl. A61k 27/00; C07d 27/54
U.S. Cl. 260—326.9
6 Claims

ABSTRACT OF THE DISCLOSURE

This disclosure describes compounds of the class of substituted heterocyclic derivatives of azepine useful as antimicrobial agents.

BRIEF SUMMARY OF THE INVENTION

This invention relates to new organic compounds and, more particularly, is concerned with novel substituted heterocyclic derivatives of azepine and methods of preparing these compounds. The novel compounds of the present invention may be represented by the following general formula:

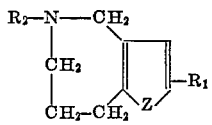

wherein Z is a divalent atom or radical consisting of oxa (—O—), thia (—S—) or imino (—NH—); $R_1$ is hydrogen or lower alkyl; and $R_2$ is hydrogen, cyanomethyl, carboxamidino, β-aminoethyl or β-guanylethyl. Suitable lower alkyl groups contemplated by the present invention are those having up to four carbon atoms such as methyl, ethyl, isopropyl, sec-butyl, and the like.

DETAILED DESCRIPTION OF THE INVENTION

The substituted heterocyclic azepine derivatives of the present invention form acid-addition salts with a variety of pharmaceutically acceptable organic and inorganic salt-forming reagents. Thus, acid-addition salts, formed by admixture of the heterocyclic azepine base with one or two equivalents of an acid, suitable in a neutral solvent, are formed with such acids as sulfuric, phosphoric, hydrochloric, hydrobromic, nitric, citric, lactic, tartaric, acetic, and related acids. For purposes of this invention, the substituted heterocyclic azepine free bases are equivalent to their non-toxic acid-addition salts.

The substituted heterocyclic azepine derivatives of the present invention may be readily prepared as set forth in the following reaction scheme:

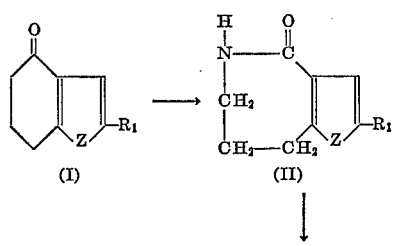

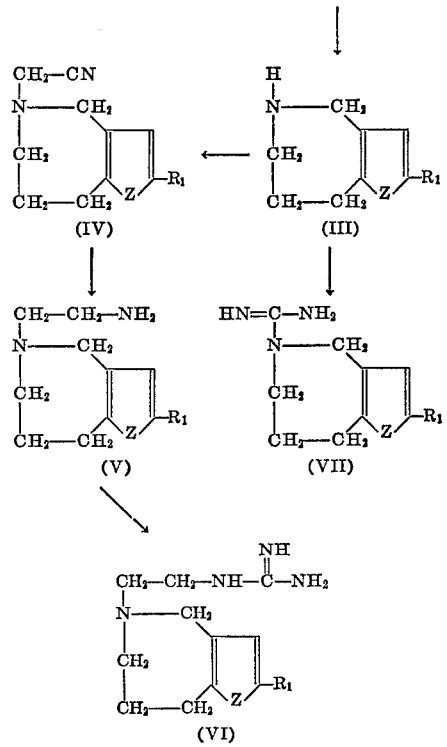

wherein Z and $R_1$ are as hereinabove defined. In accordance with the above reaction scheme, an appropriate 4-oxo-4,5,6,7-tetrahydrobenzofuran (I; Z=O), 4-oxo-4,5,6,7-tetrahydrobenzothiophene (I; Z=S) or 4-oxo-4,5,6,7-tetrahydroindole (I, Z=NH) is first converted to the corresponding oxime by treatment with hydroxylamine hydrochloride in the usual manner. Subjection of the oximes to the conditions of the Beckman rearrangement provides the corresponding 5,6,7,8 - tetrahydro - 4H - furo[3,2-c]azepin-4-one (II; Z=O), 5,6,7,8-tetrahydro-4H-thieno[3,2-c]azepin-4-one (II; Z=S) or 5,6,7,8-tetrahydropyrrolo[3,2-c]azepin-4(2H)-one (II; Z=NH). Alternatively, subjection of the tetrahydro ketones (I) to the conditions of the Schmidt rearrangement provides the azepinones (II) directly. Reduction of the azepinones (II) with lithium aluminum hydride in the standard manner furnishes the azepines (III). The azepino nitrogen can be substituted in several ways. Treatment of the azepines (III) with 3,5-dimethyl-1-guanylpyrazole nitrate provides the corresponding N-carboxamidino derivatives (VII). Reaction of the azepines (III) with glycolonitrile furnishes the corresponding N-cyanomethyl derivatives (IV), reduction of which with lithium aluminum hydride gives the N-β-aminoethyl derivatives (V). Guanylation of the primary amines (V) to provide the guanidines (VI) is achieved by treatment with S-methylisothiourea sulfate.

The novel compounds of the present invention are useful as antibacterial agents and possess antibacterial activity in vitro against a variety of standard laboratory microorganisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile nutrient agar capable of supporting growth of the bacterial test cultures. The standard sterile nutrient agar solutions containing the different dilutions of the test compounds, along with suitable and comparable control dilutions containing no test compound, are then allowed to cool in Petri dishes thereby forming solidified agar plates. The test bacteria are prepared for use by growing in broth overnight. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of bacterial growth is noted. Appropriate calibration of these observations permits the quantitative calculation of the minimal inhibitory concentration (expressed in micrograms per milliliter) causing complete inhibiton of growth for each test compound.

In a representative operation, and merely by way of illustration, the minimal inhibitory concentration of typical compounds of this invention against the indicated test organisms as determined in the above-described assay are set forth in the table below:

TABLE

| Organism | Minimal inhibitory conc., mcg./ml. | | |
|---|---|---|---|
| | (1) | (2) | (3) |
| Staphylococcus aureus ATCC 6538 P | | | 250 |
| Mycobacterium smegmatis ATCC 607 | 250 | 250 | 250 |
| Streptococcus faecolis ATCC 8043 | | | 250 |
| Salmonella gallinarium Lederle 604 | | | 250 |

[1] 4,6,7,8-tetrahydro-2-methyl-5H-furo[3,3-c]azepine.
[2] 2-(4,6,7,8-tetrahydro-2-methyl-5H-furo[3,2-c]azepin-5-yl)-ethylguanidine hemisulfate.
[3] 2-(4,6,7,8-tetrahydro-5H-thieno[3,2-c]azepin-5-yl)ethylguanidinehemisulfate.

The in vitro antimicrobial activity of the novel compounds of the present invention makes them useful as additives to materials which are subject to microbial deterioration such as cutting oils and fuel oils. They are also useful in soaps, shampoos, and topical compositions for the treatment of wounds and burns. In addition, 2-(4,6,7,8-tetrahydro-2-methyl - 5H - furo[3,2 - c]azepin - 5-yl)ethylguanidine is active in the carrageenin assay for anti-inflammatory activity and 5 - (2 - aminoethyl) - 4,6,7,8-tetrahydro-5H-thieno[3,2 - c]azepine is active in the phenyl-p-benzoquinone writhing assay for analgesic activity. It is also apparent from the reaction scheme hereinabove that many of the novel compounds of the present invention have utility as intermediates.

The invention will be described in greater detail in conjunction with the following specific examples.

EXAMPLE 1

Preparation of 4-oxo-4,5,6,7-tetrahydroindole oxime

A mixture of 2.70 g. (20 mmoles) of 4-oxo-4,5,6,7-tetrahydroindole [H. Stetter and R. Lauterbach, Ann., 655, 20 (1962)], 5 ml. of ethanol, 5 ml. of pyridine, and 1.39 g. (20 mmoles) of hydroxylamine hydrochloride is heated on a steam bath for 2 hours. The mixture is concentrated and the residue is treated with brine and ethyl acetate. The organic layer is concentrated to a viscous oil which crystallizes on standing. Two recrystallizations from acetone gives a low yield of colorless prisms, M.P. 174–179° C.

A superior procedure is the following. A solution of 18 g. of 4-oxo-4,5,6,7-tetrahydroindole in 150 ml. of hot water is treated with a solution of 45 g. (excess) of hydroxylamine hydrochloride in 180 ml. of 10% sodium hydroxide and the mixture is heated on a steam bath for 30 minutes. At this time crystals begin to appear. Just enough ethanol is added to dissolve them and the hot solution is filtered. Upon cooling, the filtrate gives 18.9 g. of crystals. Recrystallization from ethanol-water gives 12.4 g. (62%) of colorless needles, M.P. 168.5–170.5° C. This product is sufficiently pure for use in subsequent preparations.

EXAMPLE 2

Preparation of 5,6,7,8-tetrahydropyrrolo[3,2-c]azepin-4(2H)-one

A stirred solution of 12.4 g. (83 mmoles) of 4-oxo-4,5,6,7-tetrahydroindole oxime (Example 1) in 65 ml. of N,N-dimethylformamide is treated portionwise with 15.7 g. (83 mmoles) of p-toluenesulfonyl chloride. After 20 hours, the mixture is concentrated under reduced pressure and the glassy residue is dissolved in 300 ml. of 20% NaOH. This solution is warmed on a steam bath for 45 minutes, filtered, and cooled at 5° C. White crystals form from the cooled solution (10.3 g., 83%). Recrystallization from water gives M.P. 248–250° C.

EXAMPLE 3

Preparation of 1,4,5,6,7,8-hexahydropyrrolo[3,2-c]azepine

A mixture of 0.75 g. of 1,4,5,6,7,8-hexahydropyrrolo-[3,2-c]azepin-4-one (Example 2), 1.0 g. of lithium aluminum hydride, and 70 ml. of purified dioxane, under nitrogen, is stirred and heated at reflux temperature for 20 hours. It is then cooled in an ice bath, treated cautiously with 6 ml. of water and 1 ml. of 15% NaOH, filtered, and concentrated. The crystalline residue (520 mg., 57%) melts at 194–198° C. after successive recrystallizations from ethanol-ethyl acetate and acetone.

EXAMPLE 4

Preparation of 5,6,7,8-tetrahydro-2-methyl-4H-furo[3,2-c]azepin-4-one

A mixture of 9.22 g. (56 mmoles) of 2-methyl-4-oxo-4,5,6,7-tetrahydrobenzofuran [H. Stetter and R. Lauterbach, Ann. 655, 20 (1962)], 4.6 g. (71 mmoles) of sodium azide, and 100 ml. of polyphosphoric acid is stirred at 70° C. in a large flask for 2 hours, then at room temperature for 18 hours. The viscous mixture is stirred with ice water until complete solution occurs and it is then extracted with methylene dichloride. This extract is dried and concentrated, whereupon the residue crystallizes. It is washed with a little ether (yield 2.19 g.) and recrystallized from ethyl acetate, M.P. 142–144.5° C.

EXAMPLE 5

Preparation of 5,6,7,8-tetrahydro-2-methyl-4H-furo-[3,2-c]azepine

This compound is prepared by the method described above for the pyrroloazepine in Example 3. From 1.0 g. of 4,6,7,8-tetrahydro-2-methyl - 5H - furo[3,2-c]azepin-4-one (Example 4) there is obtained an amber liquid which shows one spot on thin layer chromatography. Upon treatment with ethanolic picric acid it gives a yellow picrate, M.P. 185–187.5° C.

EXAMPLE 6

Preparation of 5,6,7,8-tetrahydro-4H-thieno[3,2-c]azepine

This compound is prepared by the procedure described above for the pyrroloazepine in Example 3. From 5.33 g.

of 5,6,7,8-tetrahydro-4H-thieno[3,2-c]azepin - 4 - one [S. Nishimura et al., Nippon Kagaku Zasshi, 83, 343 (1962)] there is obtained 4.77 g. (97%) of pale yellow liquid, which gives a maleate salt upon treatment with one equivalent of maleic acid in ethanol. After recrystallization from ethanol this salt has M.P. 144–146° C.

EXAMPLE 7

Preparation of 5-(2-aminoethyl)-4-6,7,8-tetrahydro-2-methyl-5H-furo[3,2-c]azepine A solution containing 5 g. (33.1 mmoles) of 2-methyl-4,6,7,8-tetrahydro - 5H - furo[3,2-c]azepine (Example 5) and 1.725 g. (30.2 mmoles) of glycolonitrile in 24 ml. of ethanol and 6 ml. of water is heated at reflux temperature for 3 hours, cooled, and concentrated. The residue is purified by absorption chromatography on silica gel with benzene containing 5% ether as solvent. This procedure affords 5.36 g. of 5-cyanomethyl-4,6,7,8-tetrahydro-2-methyl-4H-furo[3,2-c]azepine as a yellow oil. Without further purification this oil is reduced to the subject product as follows.

A solution of 1.61 g. (8.45 mmoles) of this oil in 150 ml. of ether is added to a stirred suspension of 750 mg. (19.7 mmoles) of lithium aluminum hydride in 50 ml. of ether. The mixture is heated at reflux temperature for 16 hours, cooled, and cautiously treated with 4 ml. of water. After 30 minutes the mixture is filtered, and the filtrate is dried and concentrated to an oil (1.34 g., 82%). This oil gives a bismaleate salt, M.P. 143–146° C., upon treatment with ethanolic maleic acid.

EXAMPLE 8

Preparation of 5-(2-aminoethyl)-4,6,7,8-tetrahydro-5H-thieno[3,2-c]azepine

This compound is prepared by the procedure described above in Example 7. From 5.0 g. of 4,6,7,8-tetrahydro-5H-thieno[3,2-c]azepine (Example 6) is obtained 6.19 g. (98%) of 5-cyanomethyl-4,6,7,8-tetrahydro - 4H - thieno-[3,2-c]azepine as a yellow oil. Without further purification 4.05 g. of this oil is reduced to the subject product in 98% yield. The resulting oil gives a maleate salt, M.P. 120–123° C., upon treatment with ethanolic maleic acid.

EXAMPLE 9

Preparation of 5-(2-aminoethyl)-,4,5,6,7,8-hexahydropyrrolo[3,2-c]azepine

In accordance with the procedures described in Example 7, treatment of 1,4,5,6,7,8 - hexahydropyrrolo[3,2 - c]azepine (Example 3) with glycolonitrile provides 5-cyanomethyl - 1,4,5,6,7,8 - hexahydropyrrolo[3,2 - c]azepine, reduction of which with lithium aluminum hydride furnishes the subject product.

EXAMPLE 10

Preparation of 2-(4,6,7,8-tetrahydro-2-methyl-5H-furo-[3,2-c]azepin-5-yl)ethylguanidine A mixture of 194 mg. (1 mmole) of 5-(2-aminoethyl)-4,6,7,8-tetrahydro-2-methyl-5H-furo[3,2 - c]azepine (Example 7), 139 mg. (0.5 mmole) of S-methyl-isothiourea sulfate and 0.5 ml. of water is heated at 60° C. for 30 minutes and then at 100° C. for 2 hours. It is then concentrated and the residue is crystallized from ethanol. This procedure gives 61 mg. of hemisulfate salt as a white solid, M.P. 183–186° C. dec. Recrystallization from ethanol gives M.P. 184–186° C. dec. Addition of ether to the filtrate from the first crystallization from ethanol gives an additional 179 mg. of hemisulfate salt, M.P. 160–175° C. dec. (total yield 84%).

EXAMPLE 11

Preparation of 2-(4,6,7,8-tetrahydro-5H-thieno[3,2-c]-azepin-5-yl)ethylguanidine This compound is prepared by the method described in Example 10. From 392 mg. of 5-(2-aminoethyl)-4,6,7,8-tetrahydro - 5H - thieno[2,3 - c]azepine (Example 8) there is furnished 446 mg. (78%) of white crystals of the hemisulfate, M.P. 199–202° C. dec. Recrystallization from water gives M.P. 202–204° C. dec.

EXAMPLE 12

Preparation of 2-(1,4,5,6,7,8-hexahydropyrrolo[3,2-c]azepin-5-yl)ethylguanidine

Treatment of 5-(2-aminoethyl)-1,4,5,6,7,8-hexahydropyrrolo[3,2-c]azepine (Example 9) with S-methyl-isothiourea sulfate by the procedure of Example 10 is productive of the hemisulfate salt of the subject product.

EXAMPLE 13

Preparation of 4,6,7,8-tetrahydro-2-methyl-5H-furo-[3,2-c]azepine-5-carboxamidine A mixture of 1.512 g. (10 mmoles) of 4,6,7,8-tetrahydro-5H - furo[3,2 - c]azepine (Example 5) and 0.2 g. (1 mmole) of 3,5-dimethyl-1-guanylpyrazole nitrate [F. L. Scott, D. G. O'Donavan and J. Reilly, J. Am. Chem. Soc., 75, 4053 (1953)] is warmed at 120° C. for 3 hours, cooled, and treated with ether. An oil separates. This oil solidifies after it is washed several times with ether. Recrystallization of this solid from methanol-ether gives 185 mg. (72%) of the nitrate salt of the subject product as a light tan solid, M.P. 173–175° C. dec.

EXAMPLE 14

Preparation of 4,6,7,8-tetrahydro-5H-thieno[3,2-c]azepine-5-carboxamidine

Treatment of 4,6,7,8-tetrahydro-5H-thieno[3,2-c]azepine (Example 6) with 3,5-dimethyl-1-guanylpyrazole nitrate by the procedure described in Example 13 is productive of the nitrate salt of the subject product.

EXAMPLE 15

Preparation of 1,4,5,6,7,8-hexahydropyrrolo[3,2-c]azepine-5-carboxamidine

Treatment of 1,4,5,6,7,8-hexahydropyrrolo[3,2-c]azepine (Example 3) with 3,5-dimethyl-1-guanylpyrazole nitrate by the procedure described in Example 13 is productive of the nitrate salt of the subject product.

We claim:

1. A compound selected from the group consisting of those of the formula:

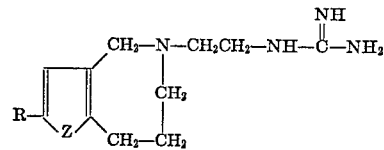

wherein Z is a divalent moiety selected from the group consisting of oxa, thia and imino, and R is selected from the group consisting of hydrogen and an alkyl group having up to four carbon atoms; and the pharmacologically acceptable acid addition salts thereof.

2. A compound according to claim 1 wherein Z is oxa and R is methyl; 2-(4,6,7,8-tetrahydro-2-methyl-5H-furo-[3,2-c]azepin-5-yl)ethylguanidine.

3. A compound according to claim 1 wherein Z is thia and R is hydrogen; 2-(4,6,7,8-tetrahydro-5H-thieno[3,2-c]azepin-5-yl)ethylguanidine.

4. A compound according to claim 1 wherein Z is thia and R is methyl; 2-(4,6,7,8-tetrahydro - 2 - methyl - 5H-thieno[3,2-c]azepin-5-yl)ethylguanidine.

5. A compound according to claim 1 wherein Z is oxa and R is hydrogen; 2-(4,6,7,8-tetrahydro-5H-furo[3,2-c]azepin-5-yl)ethylguanidine.

6. A compound according to claim 1 wherein Z is imino and R is hydrogen; 2 - (1,4,5,6,7,8 - hexahydro-pyrrolo[3,2-c]azepin-5-yl)ethylguanidine.

References Cited

UNITED STATES PATENTS

| | | | |
|---|---|---|---|
| 3,055,883 | 9/1962 | Mull | 260—239 |
| 3,030,378 | 4/1962 | Mull | 260—313 |
| 3,401,201 | 9/1968 | Walton | 260—566 |

OTHER REFERENCES

Burger, Medicinal Chemistry, 3rd Ed., Part I (Wiley—Interscience, N.Y., 1951), p. 77.

Stankevicius et al., Chemical Abstracts 72: 66776a (Mar. 30, 1970).

HENRY R. JILES, Primary Examiner

C. M. S. JAISLE, Assistant Examiner

U.S. Cl. X.R.

260—329 F, 347.7; 424—274, 275, 285